United States Patent [19]

Chiba et al.

[11] Patent Number: 5,588,075
[45] Date of Patent: Dec. 24, 1996

[54] METHOD AND APPARATUS FOR ENCODING AND DECODING IMAGE DATA

[75] Inventors: Hirotaka Chiba; Kimitaka Murashita; Tsugio Noda, all of Kawasaki, Japan

[73] Assignee: Fujitsu Limited, Kawasaki, Japan

[21] Appl. No.: 233,421

[22] Filed: Apr. 28, 1994

[30] Foreign Application Priority Data

Sep. 2, 1993 [JP] Japan .................................. 5-218269

[51] Int. Cl.⁶ ................................................. G06K 9/36
[52] U.S. Cl. ........................ 382/239; 358/433; 382/246
[58] Field of Search .................................. 382/232, 239, 382/244, 246, 248; 358/426, 427, 261.2, 261.3, 261.4, 432, 433

[56] References Cited

U.S. PATENT DOCUMENTS

| | | | |
|---|---|---|---|
| 5,107,345 | 4/1992 | Lee | 358/261.4 |
| 5,189,526 | 2/1993 | Sasson | 358/432 |
| 5,276,525 | 1/1994 | Gharavi | 358/426 |
| 5,387,982 | 2/1995 | Kitaura et al. | 358/426 |
| 5,428,693 | 6/1995 | Murakami et al. | 382/232 |

*Primary Examiner*—Joseph Mancuso
*Attorney, Agent, or Firm*—Staas & Halsey

[57] ABSTRACT

A method and apparatus for encoding and decoding image data in which continuous still images are compressed and decompressed. The apparatus divides a plurality of multi-value image data into blocks each comprising a plurality of pixels, the pixels in the block are orthogonal converted and compressed, and the original image data is decompressed from the encoded data. The apparatus detects the block having an image change as an effective block. For a macro block including a plurality of effective blocks, a compressing order of the macro blocks is decided by the order according to appearance frequencies of the effective blocks or a predetermined order and the image data is compressed every macro block. As encoded data, the order information and code information of the macro block are sequentially transmitted. In this instance, the code amount is monitored. When the code amount exceeds a predetermined threshold value, the compression is stopped and the compression of the next image is performed. The encoded data is sequentially sent to the decompressing side and is decompressed in accordance with the order from the macro block of a portion of large change in the image. Even when the compression is stopped during the image processing because of a limitation of a code transmission amount, the image is reconstructed from the portion to which a person more carefully observes, so that a discrete motion or a background block noise does not occur.

22 Claims, 12 Drawing Sheets

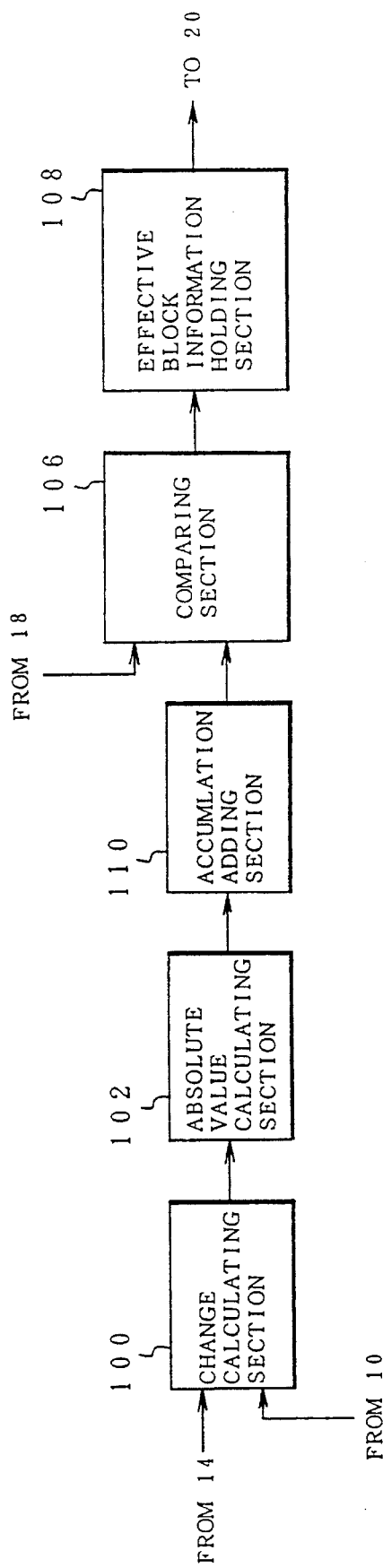
F I G. 6

Bij

| | i → | | |
|---|---|---|---|
| 1 | | | 4 |
| $M_{11}$ | $M_{21}$ | $M_{31}$ | $M_{41}$ |
| $M_{12}$ | $M_{22}$ | $M_{32}$ | $M_{42}$ |
| $M_{13}$ | $M_{23}$ | $M_{33}$ | $M_{43}$ |

METHOD AND APPARATUS FOR ENCODING AND DECODING IMAGE DATA

BACKGROUND OF THE INVENTION

The present invention relates to method and apparatus for encoding and decoding image data in which continuous still images are encoded and compressed and the compressed images are decompressed and, more particularly, to a method and apparatus for encoding and decoding image data by using an orthogonal transformation encoding in which each of a plurality of still images is divided into blocks each comprising a plurality of pixels and the pixels in the block are orthogonally transformed and encoded.

In order to store image data whose information amount is extraordinarily larger than that of numerical value data, particularly, data such as half tone image or color image or to transfer such data at a high speed with a high quality, it is necessary to encode and compress a gradation value of each pixel at a high efficiency. As an encoding method of compressing still image data at a high efficiency, there is, for example, an adaptive discrete cosine transforming (hereinafter, referred to as an ADCT) method. According to the ADCT, an image is divided into blocks each comprising (8×8) pixels and pixel signals of each block are transformed to DCT coefficients of a space frequency distribution by a two-dimensional discrete cosine transformation (hereinafter, referred to as a DCT). Subsequently, the DCT coefficients are quantized by a threshold value which is adapted to the eyesight and, further, the quantized DCT coefficients which are obtained are encoded by using a Huffman table which was statistically obtained.

Conventionally, an encoding method using a moving image as a target can obtain a higher compression ratio than that of an encoding method using a still image as a target. However, there are drawbacks such as large circuit scale, low picture quality, high costs, and the like. As an encoding method of a moving image which can solve those problems, the inventors of the present invention et al. have proposed an encoder in FIG. 1 and a decoder in FIG. 2 (Japanese Patent Application No. 077,957/1992).

An encoder in FIG. 1 comprises an encoding section 202, a reference block holding section 204, an effective block discriminating section 206, and a discrimination value holding section 208. Continuous frame images are input from an input terminal 200. In the continuous frame images, when the present frame is compared with the previous frame, a moving image region having a change and a still image region having no change exist. Only the moving image region having a change is encoded by using the encoding method of a still image and the encoded result is transmitted together with information indicating the position of the moving region. That is, input frame images are compared every pixel at the same position of the same block by the effective block discriminating section 206. When there is a change which exceeds a discrimination value held in the discrimination value holding section 208, the block is decided as an effective block which constructs the moving image region. The result of the discrimination of the effective block discriminating section 206 is transferred to the encoding section 202, by which the pixels of the effective block are encoded and the encoded data which is obtained by combining code information and discrimination information indicative of the position of the effective block is output from an output terminal 210. The portions of the effective blocks of the frame images held in the reference block holding section 204 are rewritten.

On the other hand, a decoder in FIG. 2 comprises a code separating section 214, a decoding section 216, an address generating section 218, and a decoded image holding section 220. Encoded data from an input terminal 212 is transferred to the code separating section 214, by which it is separated to the discrimination information indicating the position of the effective block and the code information. The decoding section 216 decodes the pixel data of an amount of one block from the code information. Simultaneously, the address generating section 218 generates an address signal showing the pixel position of the effective block. Therefore, with respect to only the block existing at the same position as that of the effective block which was judged on the encoding side in the present image held in the decoded image holding section 220, the decoded pixels are rewritten. Namely, only the moving image region in the decoded image is updated. As mentioned above, according to the encoding and decoding method proposed by the inventors of the present invention et al., the compression ratio can be raised as compared with that in case of encoding all of the images in one frame as still images.

In the case where there is a limitation of a code amount which can be transferred per unit time, it is necessary to reduce the number of blocks by raising the discrimination value which is used to discriminate the effective block and setting only the blocks having larger changes as effective blocks on the encoding side. However, in the case where the discrimination value is raised in order to reduce the number of effective blocks, the block is decided as an effective block at the time point when the changes of the image have been stored to a certain extent, and the encoding and transmission are executed. Thus, the movement of the decoded image is expressed discretely and the movement of the decoded image is seen as unnatural. In the portions such as a background and the like where the changes are little, the block is judged as an effective block at a time point when the changes of the image were stored to a certain extent, and the encoding and transmission are executed, so that there is a problem such that a block-like pattern is generated in the background which should be uniform.

SUMMARY OF THE INVENTION

According to the invention, there are provided a method and apparatus for encoding and decoding image data which do not cause a block-like noise in a discrete movement or a background portion or the like even if there is a limitation in an amount of codes which can be transmitted in a unit time.

The encoding method of image data of the invention comprises the following processing steps I to VIII.

I. a reference image holding step of holding image data as a reference;

II. an image holding step of sequentially holding the image data which was continuously input as targets to be compressed;

III. an effective block detecting step of dividing the input image data which is at present the target to be compressed and reference data into blocks each including (m×m) pixel data, comparing the divided blocks, and detecting the block having a change as an effective block;

IV. a compressing order deciding step of collecting a plurality of blocks which construct the data every predetermined number of blocks to thereby set a plurality of macro blocks and deciding a compressing order every macro block;

V. an address generating step of generating pixel addresses of the input image data on a block unit basis in accordance with the order of the macro blocks decided in the order deciding step;

VI. a compressing step of reading out the pixel data of the input image data by the addresses generated in the address generating step and converting the read data into codes on a block unit basis;

VII. a code output step of outputting the encoded data which is obtained by combining the order information decided in the compressing order deciding step and the codes in the compressing step; and VIII. a compression end step of stopping the compression by the compressing step and advancing to the next encoding process when the code amount by the compressing step previously exceeds a threshold value before the image data is compressed and advancing to the next compressing process when the compression of the image data of one frame is finished before the code amount exceeds the threshold value.

In the compressing order deciding step, the compressing order of each macro block is decided in accordance with the order from the macro block in which the number of effective blocks included therein is large or the compressing order of each macro block is decided in accordance with a predetermined order. In the address generating step, the pixel addresses to read out the pixel data of all of the blocks which are included in each macro block can be generated or only the pixel addresses to read out the pixel data of the effective block included in each macro block can be also generated. In the reference image holding step, the corresponding pixels of the reference data are rewritten by the pixels of the data which is held at present and was read out for compression by the pixel addresses generated in the address generating step, thereby updating. Namely, only the data of the block which was judged as a block having a change is updated.

There are the following three methods of detecting the effective block according to the effective block detecting step.

I. The maximum value of the absolute values of differences between the respective pixel data existing at the same position in the same block of the input image data as a target to be compressed at present and the reference image data is obtained and the block in which the maximum value is equal to or larger than a predetermined discrimination value is detected as an effective block.

II. The sum of the absolute values of the differences between the respective pixel data existing at the same position in the same block of the input image data as a target to be compressed at present and the reference image data is obtained and the block in which the sum is equal to or larger than a predetermined discrimination value is detected as an effective block.

III. The sum of the square values of the differences between the respective pixel data existing at the same position in the same block of the input image data as a target to be compressed at present and the reference image data is obtained and the block in which the sum is equal to or larger than a predetermined discrimination value is detected as an effective block.

When the effective block cannot be detected with respect to the input image data as a target to be compressed at present, information indicative of no change is output in the effective block detecting step.

Further, the image data which is handled in the data compressing method of the present invention is frame image data constructed by each image data of continuous even and odd fields and the reference image data is held and rewritten every field in the reference image holding step.

On the other hand, a compressing apparatus of image data according to the present invention comprises: a reference image holding section; an image holding section; an effective block detecting section; a compressing order deciding section; an address generating section; a compressing section; a code output section; and a compression ending section. The reference image holding section holds the image data as a reference. The image holding section sequentially holds the image data which is at present continuously input as a target to be compressed. The effective block detecting section divides the present image data and reference image data into blocks each including (m×n) pixel data and compares them and detects the block having a change as an effective block. The compressing order deciding section collects a plurality of blocks constructing the image data every predetermined number of blocks to thereby set a plurality of macro blocks and decides a compressing order every macro block. The address generating section generates pixel addresses of the holding image data on a block unit basis in accordance with the order of the macro blocks. The compressing section reads out the pixels of the holding image data by the addresses generated from the address generating section and converts them into the codes on a block unit basis. The code output section outputs encoded data in which the order information of the macro blocks which was decided by the compressing order deciding section and the codes of the compressing section are combined. The compression finishing section stops the compression and progresses to a compressing process of the next image data in the case where the code amount by the compressing section exceeds a predetermined value before the image data of one frame is compressed. When the compression of the image data of one frame is finished before the code amount exceeds the threshold value, the processing routine advances to a compressing process of the next image data.

On the other hand, a decompressing method of image data of the present invention comprises the following processing steps I to VI.

I. an input step of dividing image data into a plurality of blocks every (m×n) pixels, collecting a plurality of blocks every predetermined number of blocks to thereby set a plurality of macro blocks, and inputting the encoded data including order information indicative of the compressing order every macro block and codes which are obtained by compressing a plurality of blocks included in each macro block;

II. a separating step of separating the order information and the codes included in the compressed data;

III. an address generating step of generating addresses of a plurality of pixel data which construct one or a plurality of blocks included in the macro block on the basis of the order information separated in the separating step;

IV. a decompressing step of decompressing pixels on a block unit basis from the codes separated in the separating step;

V. an image holding step of holding the decompressed image data on a block unit basis; and VI. an updating step of writing the pixel data decompressed in the decompressing step into the addresses generated in the address generating step of the decompressed image data which was held in the image holding section, thereby updating the decompressed image data on a block unit basis.

A decompressing apparatus of the invention comprises an input section, a separating section, an address generating section, a decompressing section, an image holding section, and a communicating section. The input section divides image data into a plurality of blocks every (m×n) pixels, further collects the plurality of blocks every predetermined number of blocks to thereby set a plurality of macro blocks, and inputs the encoded data including order information indicative of a compressing order of each macro block and codes which are obtained by compressing the plurality of blocks included in each of the macro blocks. The separating section separates the order information and code information which are included in the encoded data. The address generating section generates addresses of a plurality of pixel data which construct one or a plurality of blocks included in the macro block on the basis of the order information separated. The decompressing section decompresses the pixels on a block unit basis from the codes separated. The image holding section holds the decompressed image data. The transmitting section writes the pixels of the decompressed image data held in the image holding section into the addresses generated in the address generating section, thereby updating the decompressed image data on a block unit basis.

According to a method and apparatus for compressing image data of the invention as mentioned above, a block having a change is extracted as an effective block from the image data to be transmitted, a compressing order of the macro blocks is decided by the order according to the frequencies of appearance of the effective blocks or by a predetermined order for the macro blocks including a plurality of effective blocks and the compression is executed every macro block. In this instance, all of the blocks in the macro blocks are regarded as effective blocks and are compressed or only effective blocks in the macro block are compressed. The order information and code information in the macro block are sequentially transmitted as encoded data to be transmitted. At the time of transmitting, the code amount of one frame is monitored. When the code amount of one frame exceeds a predetermined threshold value, the compression and transmission of the frame as a target are stopped and the next frame is compressed and transmitted. Therefore, upon compression, the image data is transmitted preferentially from the portion of the macro block having many effective blocks indicating changes in the frame image. On the decompression side, since the image data is sequentially transmitted and decompressed in accordance with the order from the image of the portion which has a change and which people particularly watch carefully, block noises in a discrete movement or a background portion or the like are not generated.

The above and other objects, features, and advantages of the present invention will become more apparent from the following detailed description with reference to the drawings.

BRIEF DESCRIPTION OF THE DRAWINGS

FIG. 6 is a block diagram showing the second embodiment of the effective block discriminating section in FIG. 3;

DETAILED DESCRIPTION OF THE PREFERRED EMBODIMENTS

Figure 1:
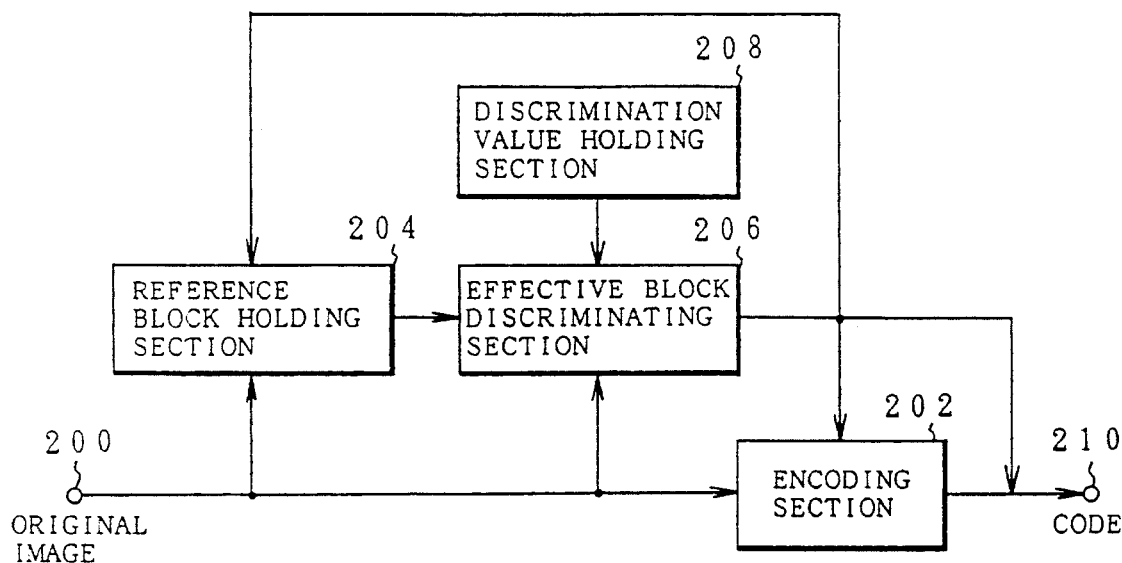
FIG. 1 is a block diagram of an encoder which has already been proposed by the inventors of the present invention et al.
Figure 2:
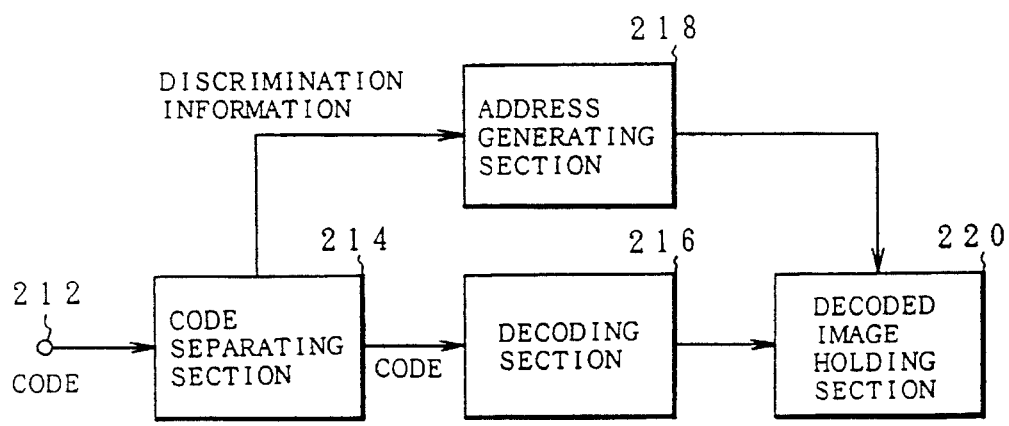
FIG. 2 is a block diagram of a decoder which has already been proposed by the inventors of the present invention et al.
Figure 3:
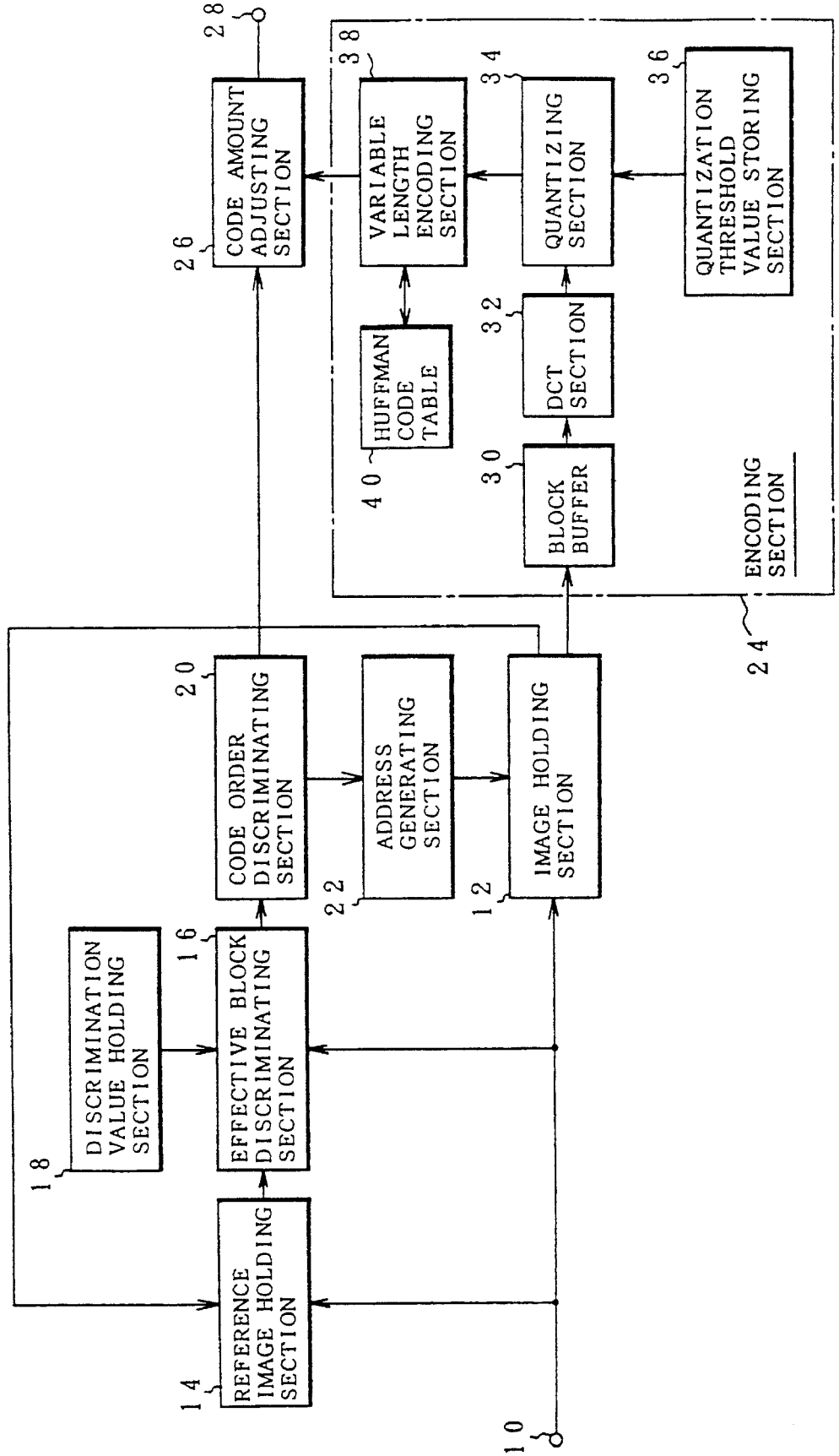
FIG. 3 is a block diagram showing an embodiment of an encoder according to the invention.

FIG. 3 shows an embodiment of an encoder of image data of the invention. Image data is continuously input from an input terminal 10 every predetermined frame period. An image holding section 12 sequentially holds the image data from the input terminal 10 on a frame unit basis, and uses the image data as a target to be encoded. The image data which was input in the previous period from the input terminal 10 is held as reference image data in a reference image holding section 14. The input image data which was input from the input terminal 10 and is a target to be processed at present and the reference image data which was held in the reference image holding section 14 and is image data of the previous frame are divided into blocks each including (m×n) pixel data and the divided blocks are compared by an effective block discriminating section 16. In the embodiment, the image data are divided in a manner such that [(8 pixels in the vertical direction)×(8 pixels in the lateral direction)=64 pixels] is set to one block. The presence or absence of a change in the image data is detected every divided block and the block in which a change of a predetermined value or more is obtained is discriminated as an effective block. A discrimination value as a threshold value which is used for the judgement of the effective block discriminating section 16 is preliminarily held in a discrimination value holding section 18. An encoding order discriminating section 20 defines a macro block including a plurality of blocks which were divided on a unit basis of 8×8 pixels and decides an order to execute the encoding every macro block. Either one of the following two methods is used to decide the encoding order of the macro block by the encoding order discriminating section 20.

I. Frequencies of appearance of the effective blocks in the macro block which was obtained in the effective block discriminating section 16 are counted and the encoding order is decided in accordance with the order from the macro block of a high appearance frequency.

II. The encoding order of the macro block is decided in accordance with a fixedly decided order irrespective of the appearance frequencies of the effective blocks in the macro block.

An address generating section 22 generates addresses to read out pixels of a plurality of blocks included in the macro block from the image holding section 12 in accordance with the encoding order of the macro block which was decided in the encoding order discriminating section 20. Therefore, the pixels of all of the blocks or only effective blocks included in each macro block are read out on a block unit basis from the image holding section 12 by the decided order of the macro block and are output to an encoding section 24. The encoding section 24 executes the encoding according to a JPEG (Joint Photographic Image Coding Experts Group) which is known as an encoding method of a still image. Specifically speaking, the encoding section 24 holds pixel signals of one block which were read out from the image holding section 12 into a block buffer 30. Subsequently, the pixel signals of one block are 2-dimensional discrete cosine transformed to DCT coefficients of a space frequency distribution by a DCT transforming section 32. The DCT coefficients of the space frequency distribution which were output from the DCT section 32 are quantized in a quantizing section 34 by using a quantization threshold value held in a quantization threshold value storing section 36, thereby obtaining quantized DCT coefficients. The quantized DCT coefficients from the quantizing section 34 are variable length encoded in a variable length encoding section 38 on the basis of a Huffman code table 40 which was statistically obtained and are output as code information to a code amount adjusting section 26. The order information of the macro blocks which was decided in the encoding order discriminating section 20 and the code information encoded in the encoding section 24 are input to the code amount adjusting section 26. After the order information and the code information are input, the code amount adjusting section 26 outputs encoded data which is obtained by combining the order information and the code information on a macro block unit basis to an output terminal 28, and transmits the encoded data to the decoding side. The code amount adjusting section 26 also monitors the code amount of the code information obtained from the encoding section 24 every encoding of one image plane. When a code amount exceeds a predetermined threshold value as an amount of codes which can be transmitted in a unit time during the operation, the code amount adjusting section 26 executes a process to cancel the encoding transmission of the macro block after that.

Figure 4:
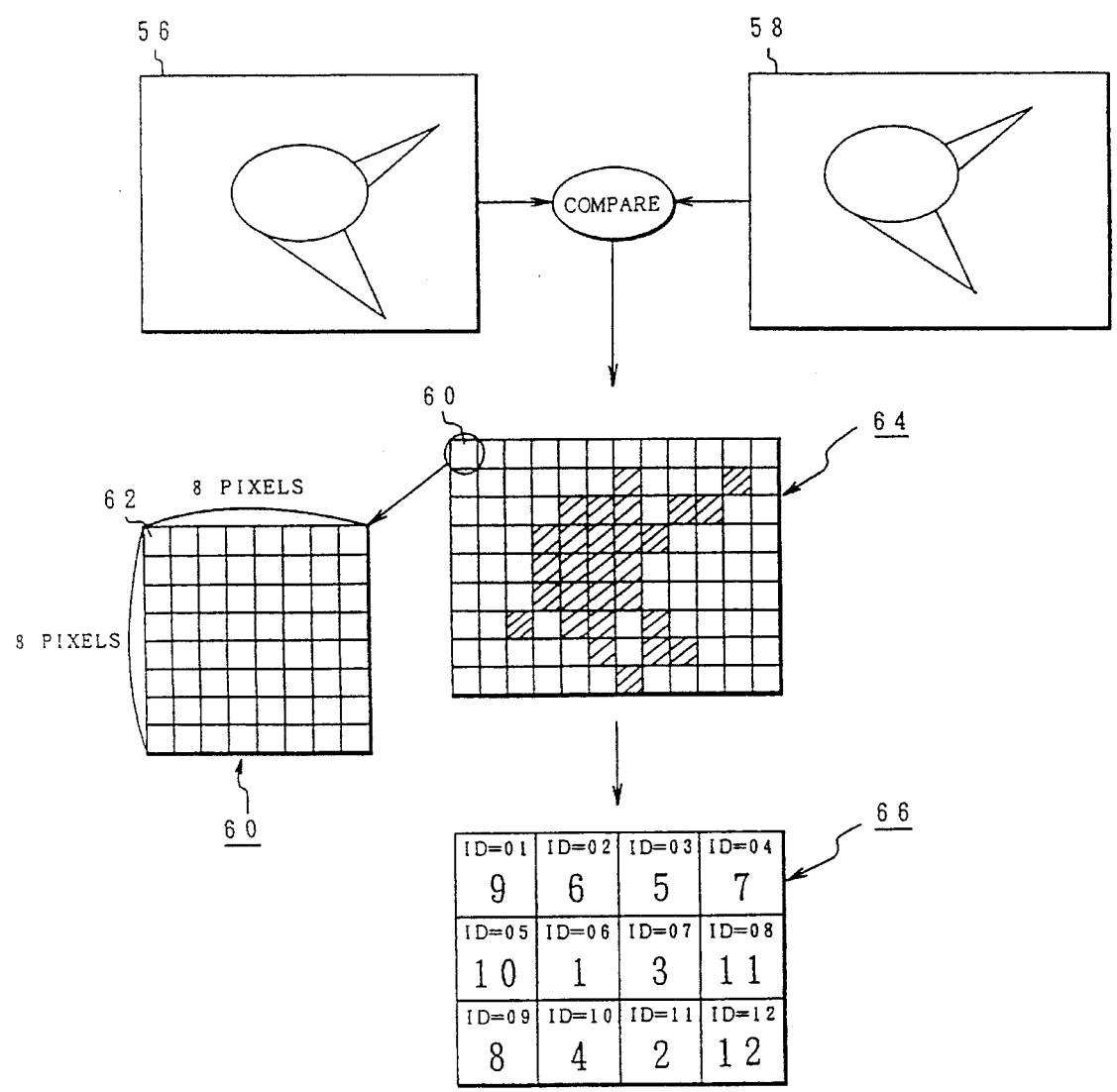
FIG. 4 is an explanatory diagram showing the contents of an encoding process according to the invention.

FIG. 4 schematically shows a processing function in the encoder of FIG. 3. First, each time an encoding target frame image 58 is input, the effective block discriminating section 16 compares every pixel of the same block of the encoding target frame image 58 with a reference frame image 56 obtained by storing the frame image which was previously input and processed and which was held in the reference image holding section 14. A change of each pixel is calculated and it is judged whether each block is an effective block or not from the change values of the pixels of one block. Specifically speaking, the effective block discriminating section 16 is realized by either one of the embodiments of FIGS. 5, 6, and 7.

Figure 5:
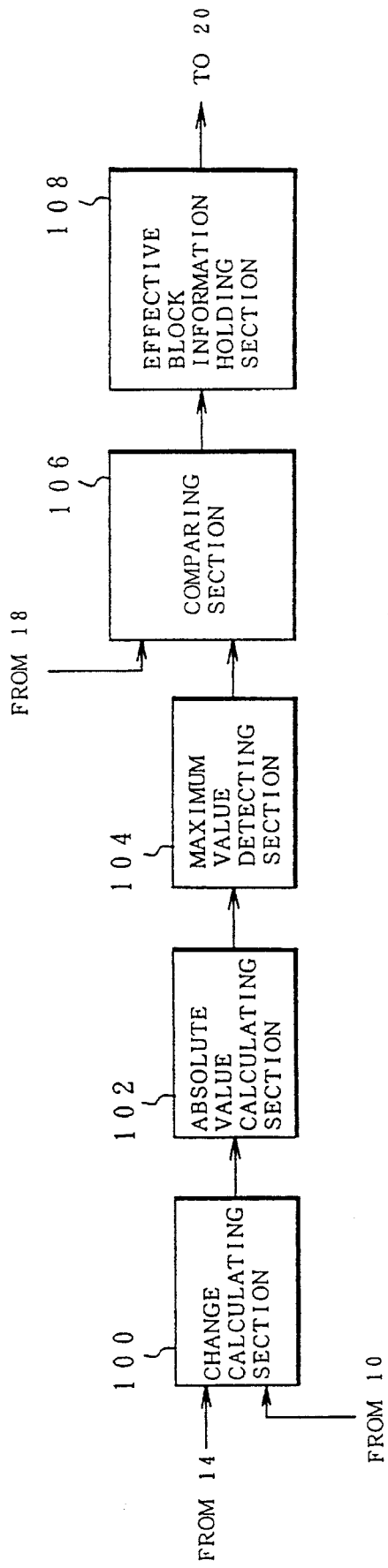
FIG. 5 is a block diagram showing the first embodiment of an effective block discriminating section in FIG. 3.

According to the first embodiment of the effective block discriminating section shown in FIG. 5, with respect to the pixels of a block from the input terminal 10, the pixels existing at the same position in the same block of a previous frame are read out from the reference image holding section 14 and change values of the pixels are calculated in a change calculating section 100. Subsequently, the absolute values of the change values of the pixels are obtained in an absolute value calculating section 102. At the time point when the absolute values of the change values of the pixels of one block are obtained, a maximum value detecting section 104 detects the maximum value among the absolute values and outputs the maximum value to a comparing section 106. A predetermined discrimination value is input from the discrimination value holding section 18 to the comparing section 106. When the maximum value among the absolute values of the pixel change values from the maximum value detecting section 104 exceeds the discrimination value, it is judged that the relevant block is an effective block. According to the discrimination result of the effective block by the comparing section 106, a corresponding block bit in a block bit map of one frame provided in an effective block information holding section 108 is set to "1" and a bit map indicating the presence or absence of the effective block is formed. In the first embodiment, since it is sufficient to detect the maximum value among the absolute values of the pixel change values, the judgement of the effective block indicating that there is a pixel change in each block can be executed by a relatively simple circuit.

According to the second embodiment of the effective block discriminating section shown in FIG. 6, an accumulation adding section 110 is provided subsequently to the change calculating section 100 and the absolute value calculating section 102. The value obtained by accumulating and adding the absolute values of the change values of the pixels in one block is output to the comparing section 106. To the comparing section 106, a predetermined discrimination value which is used for the judgement of the effective block based on the accumulation addition is input from the discrimination value holding section 18. When the accumulation addition value which exceeds the discrimination value is obtained, the comparing section 106 generates a judgement output of the effective block and the bit position of the bit map corresponding to the effective block information holding section 108 is set to "1", thereby writing that the block is as an effective block. In the second embodiment, since the effective block is judged by the value obtained by accumulating the absolute values of the change values of the pixels which construct one block, a change of one whole block can be captured.

Figure 7:
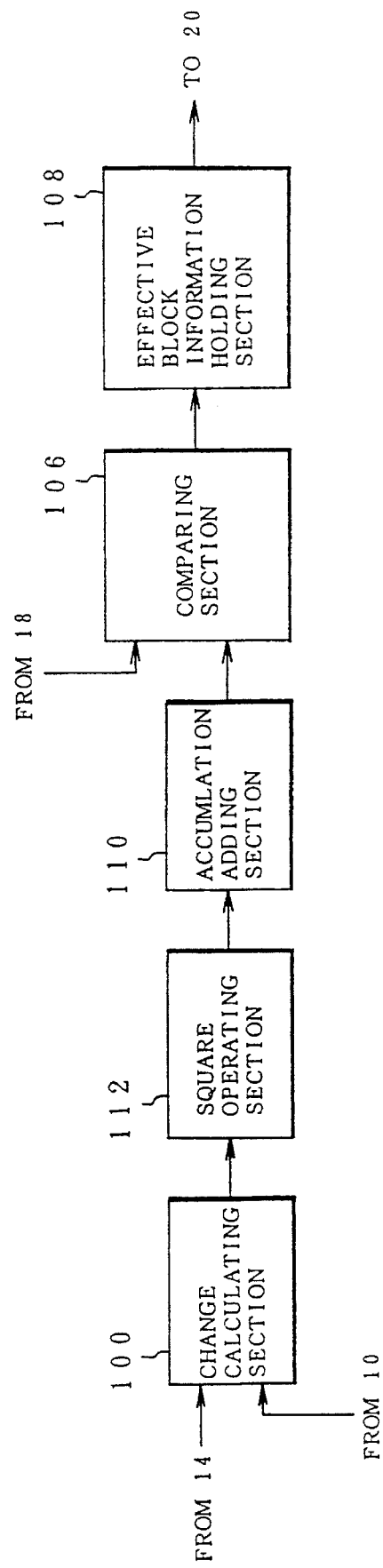
FIG. 7 is a block diagram showing the third embodiment of the effective block discriminating section in FIG. 3.

In the third embodiment of the effective block discriminating section 16 shown in FIG. 7, a square operating section 112 is provided subsequent to the change calculating section 100. The arithmetic operation result of the square operating section 112 is accumulated and added on a block unit basis by the accumulation adding section 110. The accumulation addition value of the accumulation adding section 110 is compared with a predetermined discrimination value corresponding to the accumulation value on the basis of the square operation from the discrimination value holding section 18 by the comparing section 106. When the accumulation addition value exceeding the discrimination value is obtained, the comparing section 106 generates a discrimination output of the effective block and sets the corresponding bit of the effective block information holding section 108 to 1, thereby indicating that the block is the effective block. In the third embodiment, since the effective block is discriminated by the accumulation of the square values of a pixel change amount, the change amount of the pixels is emphasized, so that a visually correct change in one block can be discriminated.

With reference to FIG. 4 again, the discrimination result by the effective block discriminating section 16 which was obtained from the comparison discrimination of the reference frame image 56 and the encoding target frame image 58 is as shown, for example, in an effective block discrimination result 64. In the effective block discrimination result 64, blocks 60 shown by a hatched portion denote the effective blocks and blank portions denote blocks which were not judged as effective blocks, namely, invalid blocks. In this instance, with respect to each block shown in the effective block discrimination result 64, as shown by enlarging a block 60 at the left upper corner on the left side, one block comprises 64 (=m×n=8×8) pixels (m=8 pixels in the lateral direction, n=8 pixels in the vertical direction). The effective discrimination result 64 obtained by the effective block discriminating section 16 is given to the encoding order discriminating section 20. The result 64 is divided into groups of macro blocks including a plurality of blocks and, after that, an encoding order discrimination result 66 for deciding the encoding order is obtained.

Figures 8A, 8B:
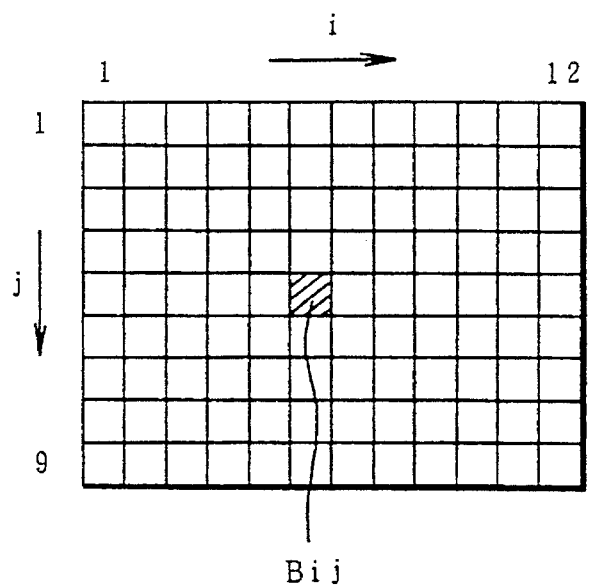
FIGS. 8A and 8B are explanatory diagrams showing the relation between a block which is encoded and a macro block to decide an encoding order.

The macro block will be first described. FIG. 8A shows a block division of an image plane in which (8×8=) 64 pixels construct one block. Each block can be specified by a block ID. For example, assuming that the number of blocks in the lateral direction is set to i=1 to m and the number of blocks in the vertical direction is set to j=1 to n, the block ID at an arbitrary position shown by a hatched portion can be defined as Bij. The block ID=Bij can be also defined by the block number or block start address indicated by the pixel on the block head position. As for the block division as mentioned above, further, according to the invention, as shown in FIG. 8B, a macro block in which a total 9 blocks (set by three blocks in the lateral direction and three blocks in the vertical direction) form one group is previously defined. Assuming that, for example, that the number of macro blocks in the lateral direction is equal to (i) and the number of macro blocks in the vertical direction is equal to (j), each macro block is specified by Mij. As a macro block ID, it is also possible to make the macro block ID a simple block number or a macro block start address which is given by the address of the head pixel at the left upper corner of the macro block. In the encoding order discrimination result 66 in FIG. 3, in order to simplify the explanation, the macro blocks ID are shown by the numerical values of 01 to 12. In this instance, in order to simplify the description in FIG. 8A, there are total 108 blocks comprising (12 blocks in the lateral direction) and (9 blocks in the vertical direction). In the PAL system, for example, (720 pixels in the lateral direction) ×(576 pixels in the vertical direction)=414,720 pixels are provided. Therefore, in case of constructing one block by 64 pixels (=8×8), (90 blocks in the lateral direction)×(72 blocks in the vertical direction)=6,480 blocks are provided.

With reference to FIG. 4 again, in the case where the macro blocks defined in FIG. 8B are allocated to the effective block discrimination result 64, in the encoding order discrimination result 66 obtained by the encoding order discriminating section 20, the numbers 1 to 12 indicating the encoding order are sequentially set to the macro blocks in accordance with the order from the macro block in which the number of effective blocks is large (the order from the macro block in which the appearance frequency of the effective blocks is high). That is, No. 1 of the encoding order is the macro block ID=06. As will be understood from the effective block discrimination result 64, the macro block is discriminated such that all of nine pixels included in the macro block are the effective blocks. No. 2 of the encoding order is the macro block ID=11 and it will be understood from the effective block discrimination result 64 that four of the nine blocks are the effective blocks. Further, as for the macro blocks of ID=01, 04, 08, and 12 after the encoding order of No. 9, there is no effective block and those orders are the same order from a view point of the appearance frequencies of the effective blocks. In this case, the encoding order is fixedly allocated in accordance with the order, for example, from the macro block in which the macro block ID is small.

As another embodiment of the encoding order discriminating section 20 for obtaining the encoding order discrimination result 66, the encoding order of the macro block can be also decided without depending on the appearance frequencies of the effective blocks in each of macro blocks as shown in FIG. 4. According to the method of fixedly deciding the encoding order, since the viewer pays an attention to, for example, the center of the screen, the encoding order is fixedly set from the center to the outside macro block. On the other hand, since there is a case where an image having a movement in a specific position on the screen in dependence on the kind of image, a high encoding order can be also fixedly set to the specific position according to the feature of the image.

The discrimination result of the encoding order in the macro block which was obtained in the encoding order discriminating section 20 is given to the address generating section 22 and the encoding by the encoding section 24 is preferentially executed from the image data of the image holding section 12 corresponding to the macro block having a high encoding order. For instance, according to the encoding order discrimination result 66 in FIG. 4, the macro block ID=06 whose effective block appearance frequency is highest is first designated. The image data from the image holding section 12 corresponding to nine blocks included in the macro block ID=06 is sequentially read out every block and is converted to code information by the encoding section 24. In this instance, as for the generation of the read address for encoding by the address generating section 22, there are two methods for sequentially generating the addresses in accordance with the order with respect to all of the blocks included in the designated macro block, encoding and method for generating the addresses of only the effective blocks included in the macro block and sequentially encoding. It is sufficient to decide in accordance with the request contents of a decoding quality whether the addresses of all of the blocks in the macro block are generated and encoded or the addresses of only effective blocks are generated and encoded. The code information which was obtained on a block unit basis by the address generation from the address generating section 22 based on the encoding order of the macro block of the encoding order discriminating section 20 is combined to the order information from the encoding order discriminating section 20 by the code amount adjusting section 26 and is output and transmitted to the decoding side by the output terminal 28.

Figure 9:
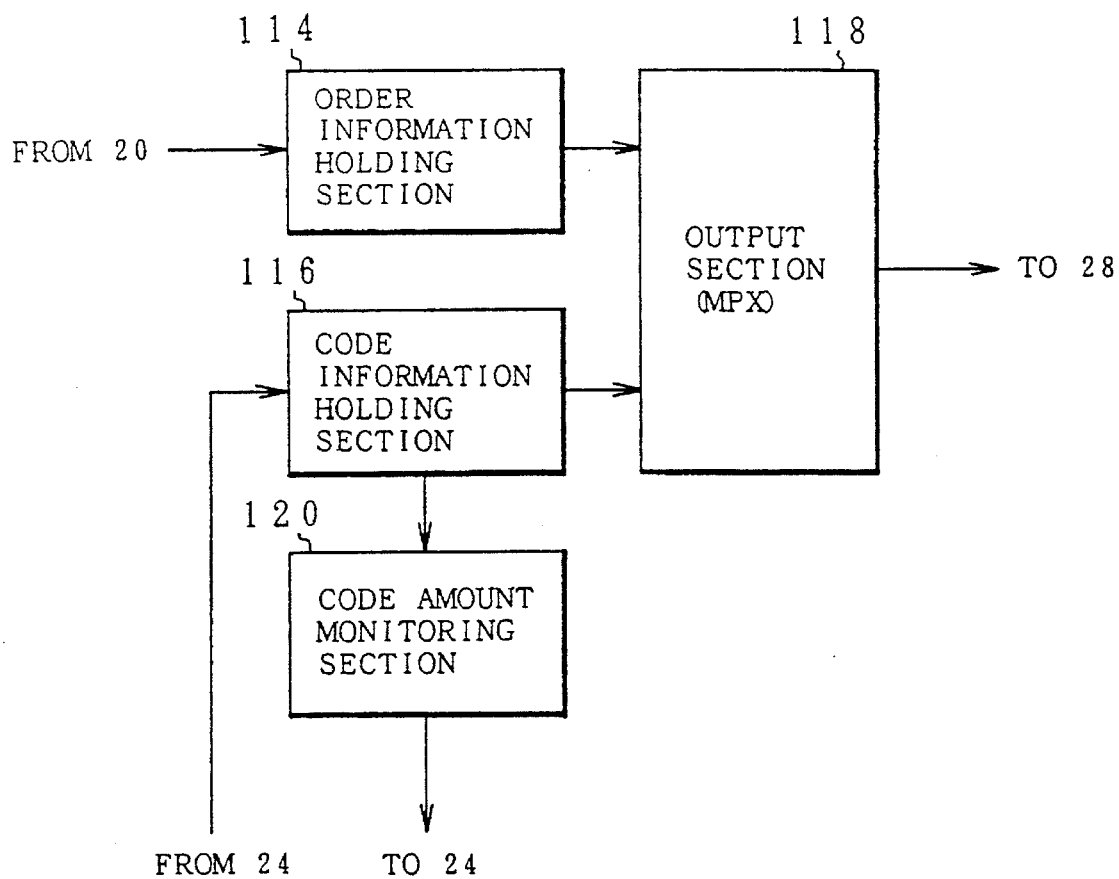
FIG. 9 is a block diagram showing an embodiment of a code amount adjusting section in FIG. 3.

FIG. 9 shows an embodiment of the code amount adjusting section 26 in FIG. 3. Order information is held in an order information holding section 114 on a macro block unit basis in association with the encoding from the encoding order discriminating section 20. The code information of one macro block is also held in a code information holding section 116 by the encoding section 24. An output section 118 is constructed by, for example, a multiplexer. When an encoding process of one macro block is finished, the output section 118 outputs the order information of the order information holding section 114 and subsequently outputs the code information of one macro block of the code information holding section 116. A code amount monitoring section 120 is further provided and monitors a code amount per one frame for the code information holding section 116. When exceeding a threshold value based on an amount of codes which can be transmitted per one frame period to the decoding side, the code amount monitoring section 120 stops the encoding of macro blocks more than that and changes to the encoding of a subsequent screen.

Figure 10:
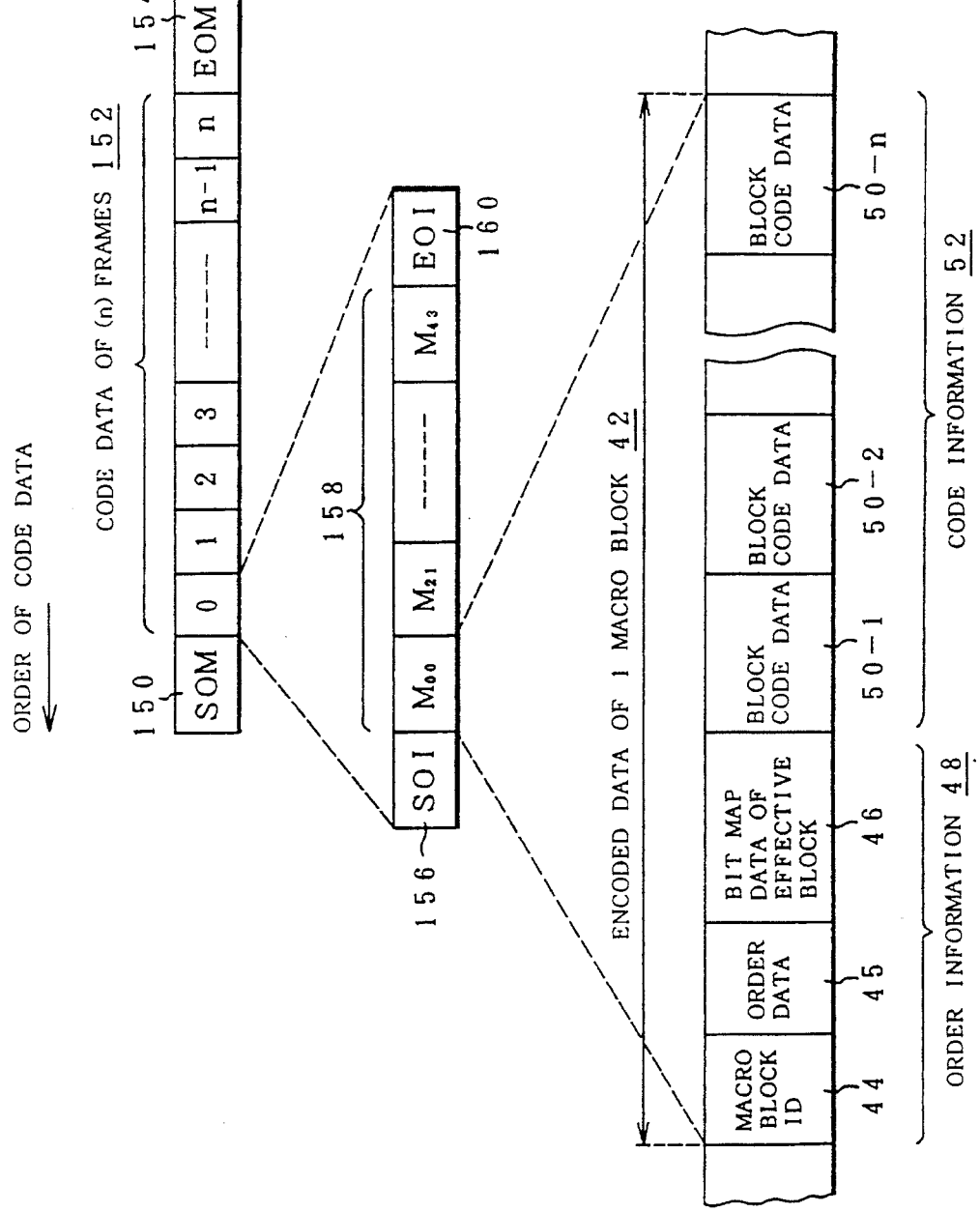
FIG. 10 is an explanatory diagram showing a format of encoded data according to the invention.

FIG. 10 shows a format of moving image data which is output to the decoding side from the output terminal 118 in FIG. 9. The moving image data is started by a start of motion (SOM) code 150 at a head position. In the intermediate portion, code data 152 of (n) frames shown by frame numbers 1 to (n) are arranged and, at the final position, an end of motion (EOM) code 154 is provided. Code data of one frame is started by a start of image (SOI) code 156, and subsequently, encoded data 158 of one frame is arranged and an end of image (EOI) code 160 is provided at the last position. In the encoded data 158 of one frame, a plurality of encoded data of every macro block shown by $M_{00}$ to $M_{43}$ is arranged. In encoded data 42 of one macro block, as shown on the lower side, the order information 48 is provided in the head position and the code information 52 of each block in the macro block is subsequently provided. The order information 48 at the head position is constructed by, for example, a macro block ID 44, order data 45, and bit map data 46 indicating the effective blocks included in the macro block. The bit map data 46 indicating the effective blocks is bit map data in which the bits of all of the blocks are set to 1 in the case where all of the blocks in the macro block are encoded by the address generating section 22 in FIG. 3. On the other hand, in case of encoding only the effective blocks in the macro block which were judged by the effective block discriminating section 16, bit map data in which the effective blocks are set to bit 1 and the other blocks are set to bit 0 is stored. Code information 52 provided subsequent to the order information 48 is constructed by the block code data 50-1 to 50-n in each block included in the macro block. Specifically speaking, the code data corresponding to the block in which bit 1 is set in the bit map data 46 of the effective blocks in the order information 48 is stored.

Figure 11:
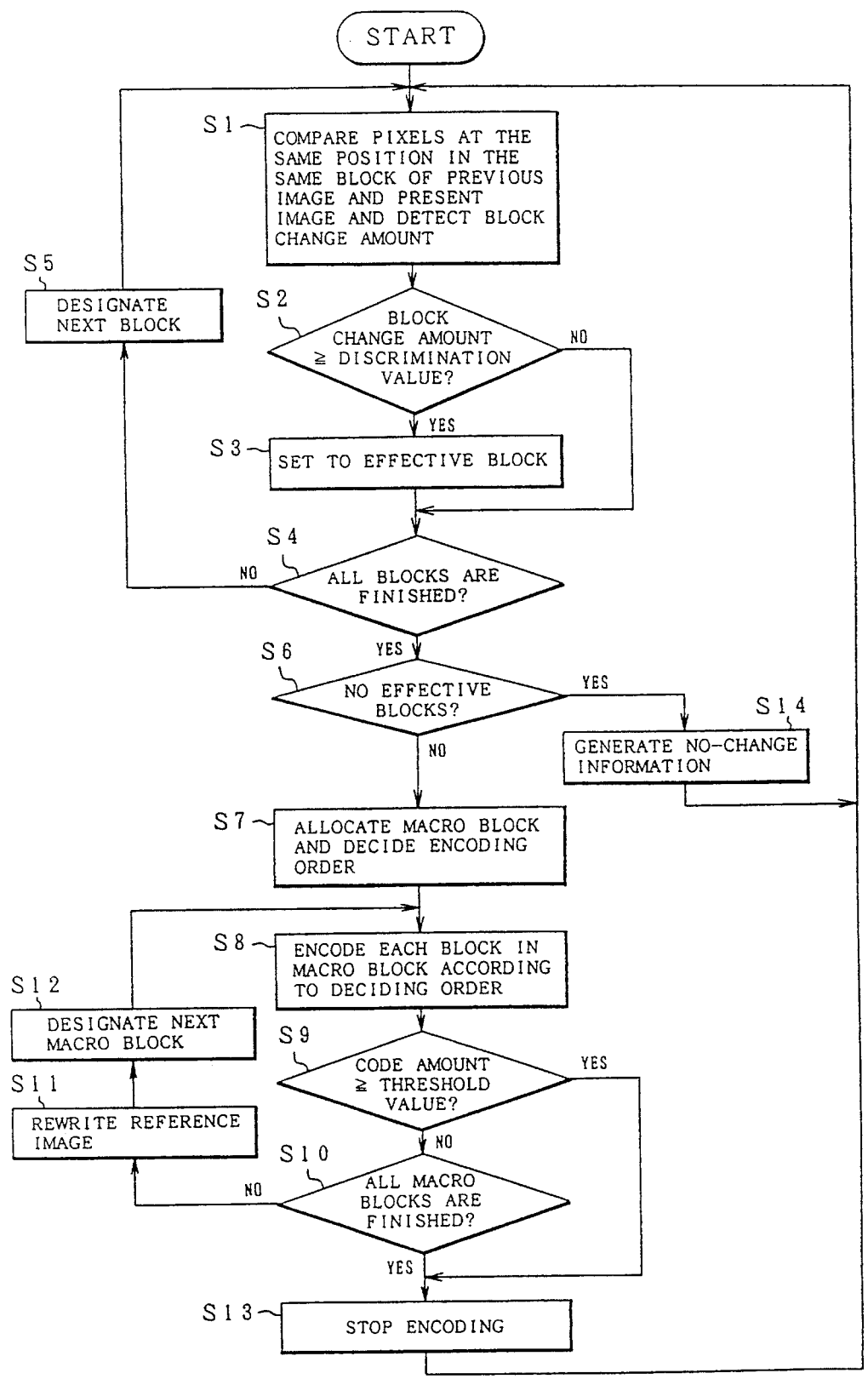
FIG. 11 is a flowchart showing an encoding procedure according to FIG. 3.

A flowchart of FIG. 11 shows the processing operation of the encoder of the invention shown in FIG. 3. When image data is successively input to the input terminal 10, the processes in steps S1 to S14 are repeated every image data. In step S1, first, a block change amount is detected every block by comparing the pixels at the same position in the same blocks of the previous image data and the present image data. Specifically speaking, the calculation of the block change amount shown in either one of FIGS. 4, 5, and 6 is executed. In step S2, a check is now made to see if the obtained block change amount is equal to or larger than a predetermined discrimination value or not. If YES, the processing routine advances to step S3 and the block is set to the effective block. If NO, namely, if the block change amount is smaller than the discrimination value, the process to set the block to the effective block in step S3 is not executed. In step S4, a check is made to see if the discriminating process of the effective block with respect to all of the blocks is finished or not. If NO, the next block is designated and the same process is repeated. When the discriminating process of the effective block is finished with respect to all of the blocks, the processing routine advances to step S6 and a check is made to see if there is no effective block. If YES, since there is no need to execute the encoding about the image plane, information of no change is output to the decoding side in step S4 and the encoding process of the image plane is finished. If the presence of the effective block is judged, the processing routine advances to step S7 and the macro block which has previously been defined is allocated and the encoding order of the macro blocks is decided on the basis of the appearance frequencies of the effective blocks included in the macro block. As another deciding method, there is also a case where the change order of the macro blocks is decided in accordance with a predetermined order. When the change order of the macro blocks is decided, each block in the macro block is encoded according to the decision order in step S8. The code amount which was obtained by the encoding is compared with a predetermined threshold value in step S9. When the code amount is less than the threshold value, a check is made to see if the processing of all macro blocks are finished in step S10. If NO, the reference image data corresponding to the macro block as a target to be encoded in the reference image data held in the reference image holding section 14 is rewritten in step S11. In step S12, a next macro block is designated in accordance with the decision order and the encoding processes in steps S8 to S10 are repeated. In the case where the code amount exceeds the threshold value in step S9 during the encoding of each macro block according to the decided encoding order, the processing routine advances to step S13 and the encoding is stopped and the encoding process of the next image data is executed. On the other hand, when the code amount doesn't exceed the threshold value, in the case where the encoding of all macro blocks is finished in step S10, the encoding is similarly stopped in step S13 and the encoding of the next image data is performed. In this instance, although the rewriting process of the reference image data held in the reference image holding section 14 in step S11 is executed on a macro block unit basis, since the encoding itself is performed on a block unit basis, it is also possible to similarly execute the rewriting process of the reference image data on a block unit basis. The rewriting of the reference image data can be easily executed by rewriting the data of only the effective block which was decided such that there was a change by the effective block discriminating section 16. Further, in order to correctly detect a change between the previous reference image data and the present processing target image data, it is also possible to rewrite the reference image data on an image plane unit basis.

Figure 12:
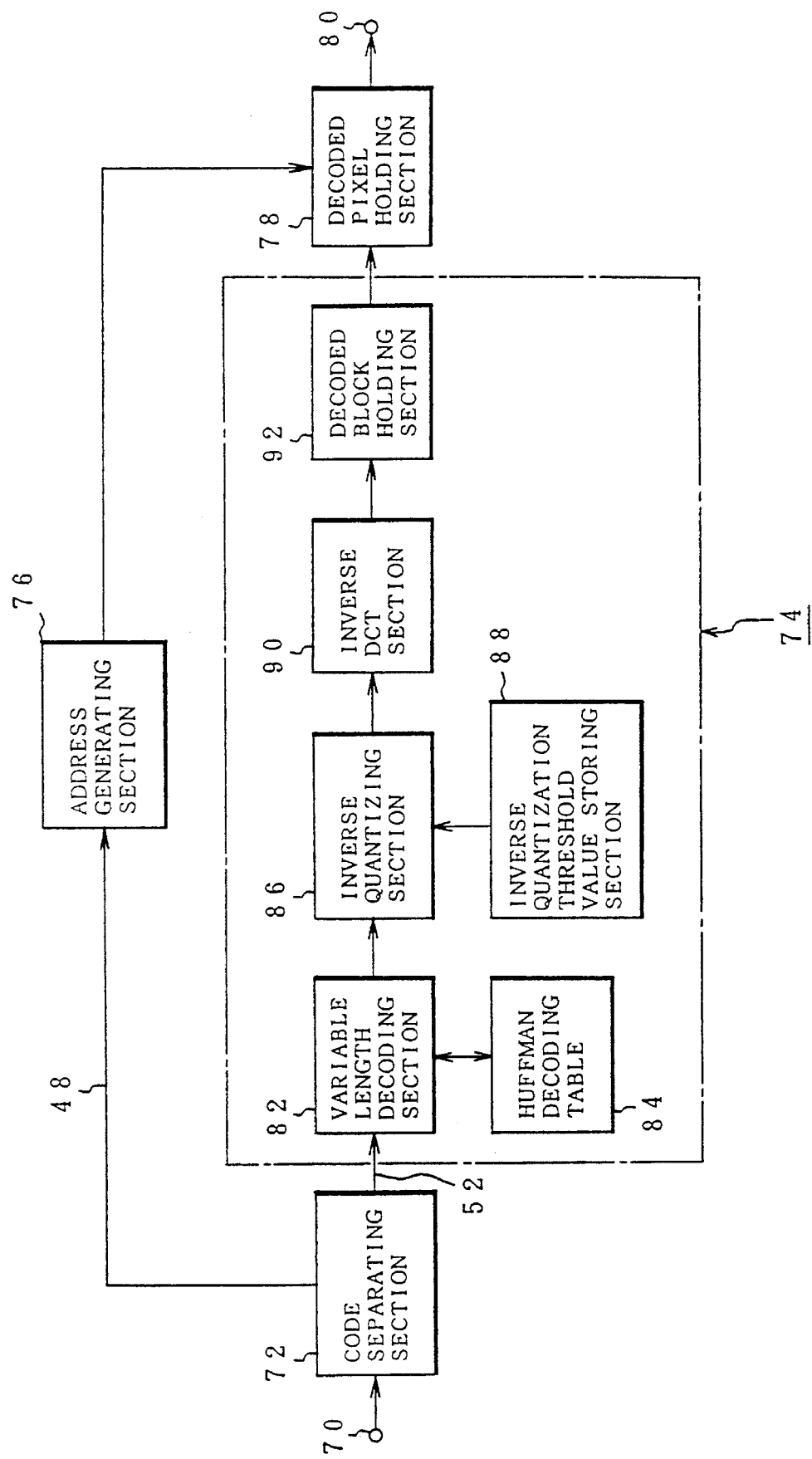
FIG. 12 is a block constructional diagram showing an embodiment of a decoder of the invention.

FIG. 12 shows an embodiment of an image data decoding apparatus of the present invention. The decoding apparatus receives the encoded data having the order information and the code information every macro block shown in FIG. 10 from an input terminal 70 and decodes the original image data. The encoded data from the input terminal 70 is given to a code separating section 72 and is separated to the order information 48 and the code information 52. The order information 48 is given to an address generating section 76, from which write addresses of the decoded pixels of each encoded block included in the macro block are generated. For instance, since the order information 48 includes the macro block ID 44 as shown in FIG. 10, the position of the macro block shown in FIG. 8B can be recognized from the macro block ID 44. Further, the effective block has the bit 1 set, namely, the encoded block is recognized from the bit map data 46 of the effective block subsequent to the order data 45, thereby recognizing a plurality of block IDs included in the macro block which are used as decoding targets shown in FIG. 8A. As mentioned above, when the block ID as a decoding target is known, the pixel head address comprising (8×8=) 64 pixels can be obtained from a look-up table or the like. Therefore, the addresses of 64 pixels can be unconditionally formed by using the head pixel address as a starting point. On the other hand, the code information 52 separated by the code separating section 72 is given to a decoding section 74. The decoding section 74 performs the decoding process according to the JPEG. That is, the code data is transformed to quantization DCT coefficients having fixed lengths by using a Huffman code table which was statistically obtained by a variable length decoding section 82 every code data of each block. Subsequently, a linear inverse quantization is executed to the quantization DCT coefficients by an inverse quantizing section 86 by multiplying the inverse quantization threshold values held in an inverse quantization value storing section 88, thereby transforming to the DCT coefficients of the space frequency distribution. Further, the DCT coefficients of the space frequency distribution are inverse two-dimensional discrete cosine transformed by an inverse DCT section 90 and are decoded to the pixel data of every block and are stored into a decoded block holding section 92. A pixel signal of one block stored in the decoded block holding section 92 is written into a decoded pixel holding section 78 using a frame memory by the pixel addresses generated from the address generating section 76, thereby rewriting the image data of the decoded block. In this instance, since the encoded data is preferentially transmitted from the encoding side from the macro block, for example, whose effective block appearance frequency is high, the decoded image data is updated from the portion of the macro block of a large change of the image. Therefore, even when the encoding transmission is stopped during the encoding transmission of one image plane by the limitation of an amount of codes which can be transmitted, since the rewriting of the decoded image data has already been finished with respect to the portion of the macro block having a large change of the image, the image change having a large change can be correctly decoded. On the other hand, since the operation to raise the discrimination value of the effective block on the encoding side in order to reduce a transmission code amount is not needed, a discrete movement of the decoded image is minimized and the block noises in a background portion are hardly generated.

Figure 13:
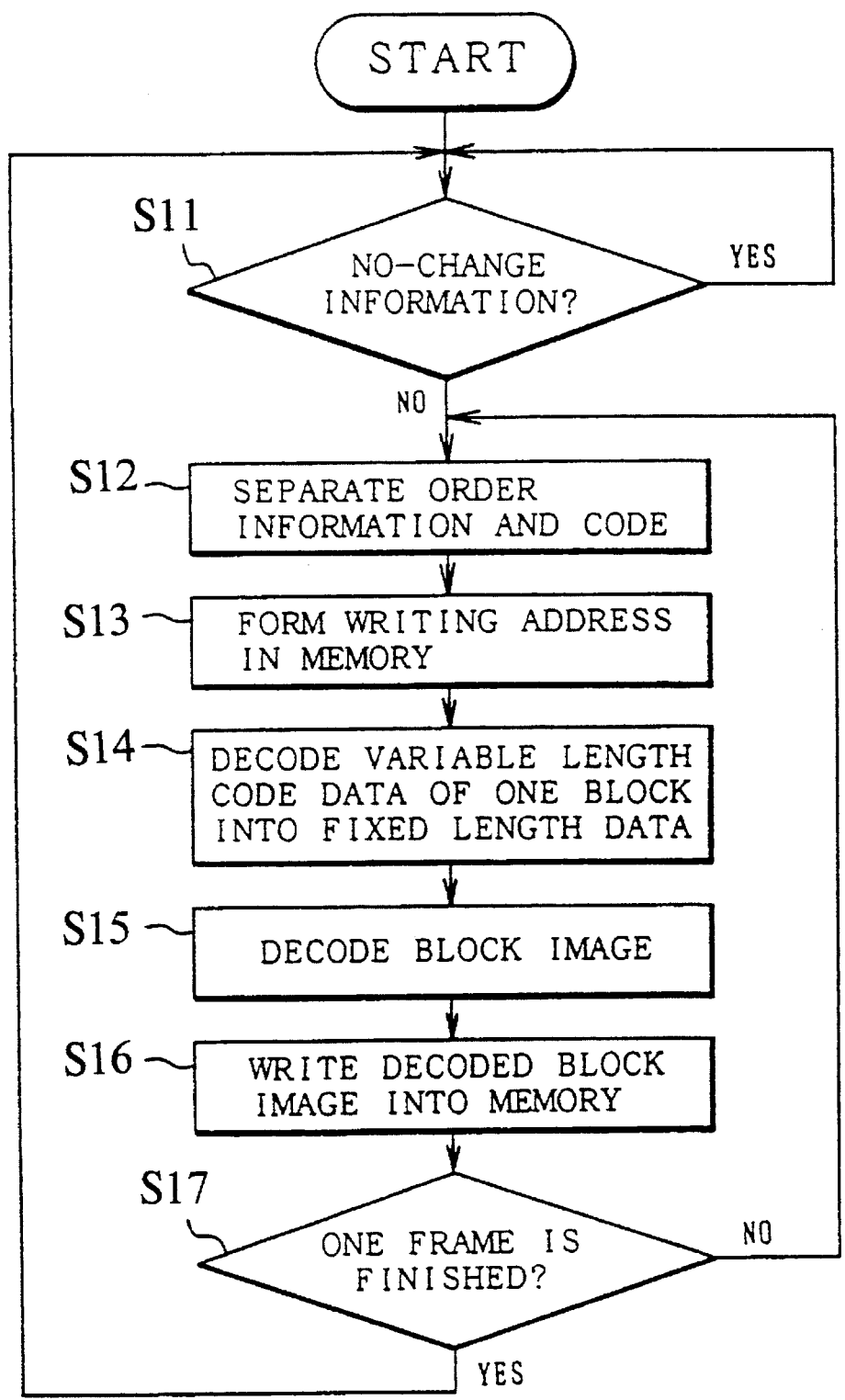
FIG. 13 is a flowchart showing a decoding process according to FIG. 12.

A flowchart of FIG. 13 shows a decoding process in the decoding apparatus in FIG. 12. When the decoding operation is started, a check is made to see if there is the no-change information which is sent in the case where there is no effective block with respect to one image plane on the decoding side or not in step S21. When the no-change information is discriminated, the decoding process is not performed and the apparatus waits the decoding information of a next image plane. In this case, the image which has already been held in the decoded pixel holding section 78 is displayed. When there is not a no-change information, the data is the effective encoded data. The processing routine advances to step S22 and the order information and the code information are separated. As for the order information, the write addresses to the memory constructing the decoded image holding section 78 are formed in the address generating section 76. With respect to the code information, the variable length decoding section 82 of the decoding section 74 decodes the variable length code data of one block to the fixed length data in step S24. After that, a block image is decoded by the inverse quantizing section 86 and the inverse DCT section 90. In step S6, the decoded block image is written into the decoded image holding section 78 by using the write addresses formed in step S23. A check is made to see if the decoding process of one frame has been finished in step S27. The processes in steps S22 to S26 are repeated until the decoding of one frame is finished. After the decoding of one frame was finished, the processing routine is returned to step S21 and the process for checking the presence or absence of the no-change information and the subsequent processes are repeated.

Although the process of an image unit basis of one frame has been described as an example with respect to each of the encoding side and the decoding side in the above embodiments, in the case where one frame comprises two fields of the odd number field and the even number field, the encoding process and the decoding process are performed on a field unit basis. That is, the reference image data is held every field on the encoding side, the effective block is discriminated by comparing with the reference field image data corresponding to the same field which was input, the encoding order of the macro blocks is decided, and the encoding is executed. On the other hand, since the decoded image data is held every field on the decoding side, the block image data which was decoded every field is rewritten by the corresponding block of the same field.

Further, it will be obviously understood that the encoder and decoder of the present invention are not limited to the hardware constructions shown in the embodiments of FIGS. 3 and 12 but the encoding algorithm shown in FIG. 11 and the decoding algorithm shown in FIG. 13 can be also realized by software.

According to the invention as mentioned above, as for the encoding and decoding methods and apparatuses of encoded data for decoding a moving image by successively encoding still images and transmitting, by giving a high priority to the image information which is important for visually recognizing the moving image which changes in each image and by encoding and transmitting the image information, although there is a limitation of an amount of codes which can be transmitted per unit time on the decoding side, smoothness of the movement can be guaranteed and a transmission and display of a moving image of a high compression ratio and a high picture quality can be realized without especially reducing a code amount per image plane.

What is claimed is:

1. A compressing method of image data which is continuously input, comprising:

a reference image holding step of holding reference image data;

an image holding step of holding said input image data;

an effective block detecting step of dividing said input image data which is at present a target to be compressed and said reference image data into blocks each including (m×n) pixels, and comparing and detecting each block having a change as an effective block;

a compressing order deciding step of grouping said blocks into macro blocks each having a predetermined number of said blocks, and deciding a compressing order of said macro blocks in accordance with a number of effective blocks in each macro block;

an address generating step of generating pixel addresses of said input image data on a block unit basis in accordance with the compressing order of the macro blocks decided in said compressing order deciding step;

a compressing step of reading out said input image data by pixels according to the pixel addresses generated in said address generating step and converting said input image data into codes on a block unit basis;

a code output step of outputting encoded data obtained by combining the order information decided in said compressing order deciding step and the codes converted in said compressing step; and a compressing end step of stopping the compression in said compressing step and processing next image data in the case where a code amount by said compressing step exceeds a threshold value before the compression of the image data of one picture screen is finished and processing the next image data in the case where the compression of the image data of one picture screen is finished before said code amount exceeds said threshold value.

2. The method according to claim 1, further comprising:

a separating step of separating the order information and the codes which are included in the encoded data, a second address generating step of generating new addresses of a plurality of pixel data forming at least one block in each macro block on the basis of the order information separated in said separating step, a decompressing step of decompressing the pixel data on a block unit basis from the codes separated in said separating step, a second image holding step of holding said decompressed pixel data on a block unit basis; and an updating step of writing the decompressed pixel data held in said image holding step into the new addresses generated in said second address generating step and updating the decompressed pixel data on a block unit basis.

3. The method according to claim 2, wherein in said second image holding step, the decompressed pixel data of odd fields and even fields is held, and in said updating step, the image data in the same field as the field of the compression is updated.

4. The method according to claim 1, wherein in said address generating step, the pixel addresses to read out the pixel data of all of the blocks included in each of said macro blocks are generated.

5. The method according to claim 1, wherein in said address generating step, the pixel addresses to read out only the pixel data of the effective blocks included in each of the macro blocks are generated.

6. The method according to claim 1, wherein in said reference image holding step, corresponding pixel data of the reference image data are rewritten by the pixels which were read out from the input image data held at present by the pixel addresses generated in said address generating step.

7. The method according to claim 1, wherein in said effective block detecting step, a maximum value of the absolute values of differences between the respective pixels existing at the same position in the same block of said input image data which is at present the target to be compressed and said reference image data is obtained, and the block in which said maximum value is at least as large as a predetermined judgment value is detected as an effective block.

8. The method according to claim 1, wherein in said effective block detecting step, a sum of the absolute values of differences between the respective pixels existing at the same position in the same block of the input image data which is at present the target to be compressed and said reference image data is obtained, and each block in which said sum is at least as large as a predetermined judgment value is detected as an effective block.

9. A method according to claim 1, wherein in said effective block detecting step, a sum of the square values of differences between the respective pixels existing at the same position in the same block of said input image data which is at present the target to be compressed and said reference image data is obtained, and each block in which said sum is at least as large as a predetermined judgment value is detected as an effective block.

10. The method according to claim 1, wherein in said effective block detecting step, in the case where no effective block is detected with respect to the input image data which is at present the target to be compressed, information indicative of no change is output.

11. The method according to claim 1, wherein said input image data is frame image data formed by the image data of continuous even field and odd field, and in said reference image holding step, the reference image data is held and rewritten every field.

12. A compressing apparatus of image data which is continuously input, comprising:

reference image holding means for holding previous image data as reference image data;

image holding means for holding the input image data which is at present a target to be compressed;

effective block detecting means for dividing said input image data and said reference image data into blocks each comprising (m×n) pixels, and comparing and detecting each block having a change as an effective block;

compressing order deciding means for grouping said blocks into macro blocks each having a predetermined number of said blocks, and deciding a compressing order of said macro blocks in accordance with a number of effective blocks in each macro block;

address generating means for generating pixel addresses of said input image data on a block unit basis in accordance with the compressing order of the macro blocks decided by said compressing order deciding means;

compressing means for grouping said blocks into macro blocks each having a predetermined number of said blocks, and deciding a compressing order of said macro blocks in accordance with a number of effective blocks in each macro block, and for converting the input image data into codes on a block unit basis;

code output means for outputting encoded data obtained by combining the order information decided by said compressing order deciding means and the codes converted by said compressing means; and compression end means for stopping the compression of said compressing means and processing next image data in the case where a code amount by said compressing means exceeds a threshold value before the compression of the image data of one picture screen is finished, and for processing the next image data in the case where the compression of the image data of one picture screen is finished before said code amount exceeds said threshold value.

13. The apparatus according to claim 12, further comprising:

separating means for separating the order information and the codes which are included in said encoded data;

second address generating means for generating new addresses of a plurality of pixel data forming at least one block in each macro block on the basis of the order information separated by said separating means;

decompressing means for decompressing the pixel data on a block unit basis from the codes separated by said separating means;

second image holding means for holding said decompressed pixel data on a block unit basis; and updating means for writing the decompressed pixel data held by said image holding means into the new addresses generated by said second address generating means and for updating the decompressed pixel data on a block unit basis.

14. The apparatus according to claim 13, wherein said second image holding means holds said decompressed pixel data of odd fields and even fields, and said updating means updates the image data in the same field as the field of the compression.

15. The apparatus according to claim 12, wherein said address generating means generates the pixel addresses to read out the pixel data of all of the blocks included in each of the macro blocks.

16. The apparatus according to claim 12, wherein said address generating means generates the pixel addresses to read out only the pixel data of the effective blocks included in each of the macro blocks.

17. The apparatus according to claim 12, wherein said reference image holding means rewrites corresponding pixel data of said reference image data by the pixel data which was read out from said input image data held at present by the pixel addresses generated by said address generating means.

18. The apparatus according to claim 12, wherein said effective block detecting means obtains a maximum value of the absolute values of differences between the respective pixels existing at the same position in the same block of said input image data and said reference image data, and detects each block in which said maximum value is at least as large as a predetermined judgment value as an effective block.

19. The apparatus according to claim 12, wherein said effective block detecting means obtains a sum of the absolute values of differences between the respective pixels existing at the same position in the same block of said input image data and said reference image data, and detects each block in which said sum is at least as large as a predetermined judgment value as an effective block.

20. The apparatus according to claim 12, wherein said effective block detecting means obtains a sum of the square values of differences between the respective pixels existing at the same position in the same block of said input image data and said reference image data, and detects each block in which said sum is at least as large as a predetermined judgment value as an effective block.

21. An apparatus according to claim 12, wherein said effective block detecting means outputs information indicative of no change in the case where no effective block is detected with respect to said input image data.

22. An apparatus according to claim 12, wherein said one image data is frame image data comprising each image data of continuous even field and odd field, and said reference image holding means holds and rewrites said reference image data every field.

* * * * *